United States Patent
Ahn

(10) Patent No.: US 8,310,962 B2
(45) Date of Patent: Nov. 13, 2012

(54) UNITED AFEC AND METHOD THEREOF, AND TDD RADIO REPEATER APPARATUS USING THE SAME

(75) Inventor: Byung-Yang Ahn, Daejon (KR)

(73) Assignee: Airpoint Co., Ltd., Daejeon (KR)

( * ) Notice: Subject to any disclaimer, the term of this patent is extended or adjusted under 35 U.S.C. 154(b) by 179 days.

(21) Appl. No.: 12/594,154

(22) PCT Filed: Nov. 23, 2007

(86) PCT No.: PCT/KR2007/005949
§ 371 (c)(1),
(2), (4) Date: Mar. 31, 2010

(87) PCT Pub. No.: WO2009/014284
PCT Pub. Date: Jan. 29, 2009

(65) Prior Publication Data
US 2010/0177668 A1 Jul. 15, 2010

(30) Foreign Application Priority Data
Jul. 25, 2007 (KR) .................. 10-2007-0074617

(51) Int. Cl.
*H04B 7/14* (2006.01)

(52) U.S. Cl. ........... 370/279; 370/350; 455/24; 714/746

(58) Field of Classification Search .......... 370/276–279, 370/291, 324, 350; 455/24, 69, 126; 714/746–751
See application file for complete search history.

(56) References Cited

U.S. PATENT DOCUMENTS

| 5,396,189 A * | 3/1995 | Hays .............................. 330/149 |
| 2003/0142655 A1* | 7/2003 | Higuchi et al. ............... 370/342 |
| 2006/0040611 A1 | 2/2006 | Ding et al. |
| 2010/0095185 A1* | 4/2010 | Ganga et al. .................. 714/758 |

FOREIGN PATENT DOCUMENTS

| JP | 08-139649 A | 5/1996 |
| JP | 2000-134143 A | 5/2000 |
| JP | 2001-186073 A | 7/2001 |

(Continued)

OTHER PUBLICATIONS

Japanese Office Action issued in Japanese Patent Appln. No. 2010-506024 on Apr. 12, 2012 with English translation, 8 pages.

*Primary Examiner* — Ricky Ngo
*Assistant Examiner* — Kan Yuen
(74) *Attorney, Agent, or Firm* — Rothwell, Figg, Ernst & Manbeck, P.C.

(57) ABSTRACT

Provided is a united Adaptive Forward Error Correction (U-AFEC), including: an automatic gain control unit for controlling a gain of forward/backward relay signals; a switching unit for switching the forward/backward relay signals; a forward feedback signal detecting unit for detecting and updating a phase and a size of a feedback signal; a backward feedback signal detecting unit for detecting and updating the phase and the size of the feedback signal; a reverse feedback signal synthesizing unit for generating a reverse feedback signal based on the phase and the size of the feedback signal; a feedback signal removing unit for removing the feedback signal in the forward/backward relay signals and transmitting the forward/backward relay signals to the automatic gain control unit; and a control unit for removing the feedback signal in the forward/backward relay signals and controlling each constituent element.

17 Claims, 5 Drawing Sheets

FOREIGN PATENT DOCUMENTS

| | | | |
|---|---|---|---|
| JP | 2002-111571 A | | 4/2002 |
| JP | 2002-118509 A | | 4/2002 |
| KR | 10-2003-0067330 | * | 8/2003 |
| KR | 10-2006-0105103 A | | 10/2006 |
| KR | 10-2007-0022436 | * | 9/2007 |
| WO | 2007/073092 A1 | | 6/2007 |

* cited by examiner

UNITED AFEC AND METHOD THEREOF, AND TDD RADIO REPEATER APPARATUS USING THE SAME

CROSS REFERENCE TO RELATED APPLICATIONS

This application is a 35 U.S.C. §371 National Phase Entry Application from PCT/KR2007/005949, filed Nov. 23, 2007, and designating the United States, which claims priority under 35 U.S.C. §119 to Korean Patent Application No. 10-2007-0074617 filed Jul. 25, 2007, which is incorporated herein in its entirety.

TECHNICAL FIELD

The present invention relates to a united Adaptive Forward Error Correction (U-AFEC) and a method thereof, a Time Division Duplex (TDD) radio repeater using the same, and a computer-readable recording medium for storing a program for realizing the method; and, more particularly, to a U-AFEC for improving a service quality by sharing one AFEC in forward/backward directions in a TDD radio repeater and completely removing a feedback signal component from a signal to be relayed and improving stability of signal relay through operation adaptive to radio channel environment change, a method thereof, a TDD radio repeater using the same, and a computer-readable recording medium for storing a program for realizing the method.

BACKGROUND ART

Generally, a Time Division Duplex (TDD) radio repeater is a device for periodically performing on/off on transmission of each signal by using a frequency channel on a forward signal of a wireless terminal direction in a wireless base station and a backward signal of the wireless base station direction in the wireless terminal. The TDD radio repeater targets on providing a high-quality service to a terminal in a dead zone and is installed within a transmission section.

At this time, a synchronization acquisition procedure for synchronizing a forward/backward on/off operation timing is performed by using a general forward preamble. Since the preamble is structuralized to efficiently acquire synchronization in the TDD method and has identification (ID) on the base station and segment information, related information can be acquired through a signal process of a synchronization acquiring unit.

FIG. 1 shows a TDD radio repeater using conventional Adaptive Forward Error Correction (AFEC) and this configuration is disclosed by KR Patent Application No. 10-2007-0022436 (Applied on Mar. 7, 2007) by the applicants of the present invention.

As shown in FIG. 1, the TDD radio repeater using the conventional AFEC includes a donor antenna 100, a donor switching unit 102, a first down-converting unit 103, a synchronization acquiring unit 105, an AFEC 104, a first up-converting unit 106, a service antenna 109, a service band-pass filter 108, a service switching unit 107, a second down-converting unit 110 and a second up-converting unit 111.

The donor antenna 100 transmits/receives a signal to be relayed with the base station, i.e., a forward/backward relay signal. The donor band-pass filter 101 performs band on forward/backward relay signals transmitted/received through the donor antenna 100.

The donor switching unit 102 switches the forward relay signal from the donor band-pass filter 101 to the first down-converting unit 103 according to control of the synchronization acquiring unit 105, or switches the backward relay signal from the second up-converting unit 111 to the donor band-pass filter 101.

The first down-converting unit 103 down-converts the forward relay signal switched in the donor switching unit 102 into a baseband signal. The synchronization acquiring unit 105 acquires synchronization with the base station based on the forward relay signal down-converted in the first down-converting unit 103.

The AFEC 104 removes a feedback signal from the forward relay signal down-converted in the first down-converting unit 103 or the backward relay signal down-converted in the second down-converting unit 110 based on information from the synchronization acquiring unit 105 and controls gains of the forward/backward relay signals.

The first up-converting unit 106 up-converts the forward relay signal from the AFEC 104 into a relay signal of a high-frequency band again. The service antenna 109 transmits/receives a signal to be relayed with a terminal of a service region, i.e., a forward/backward relay signal.

The service band-pass filter 108 performs band filtering on the forward/backward relay signal transmitted/received through the service antenna 109. The service switching unit 107 switches the forward relay signal from the first up-converting unit 106 to the service band-pass filter 108 according to control of the synchronization acquiring unit 105, or switches the backward relay signal from the service band-pass filter 108 to the second down-converting unit 110.

The second down-converting unit 110 down-converts the backward relay signal switched in the service switching unit 107 into a baseband signal and transmits the baseband signal to the AFEC 104.

The second up-converting unit 111 up-converts the backward relay signal from the AFEC 104 into a relay signal of a high-frequency band again and transmits the relay signal to the donor switching unit 102.

Detailed configuration and operation of the AFEC 104 will be described in detail hereinafter with reference to FIG. 2.

FIG. 2 is a block diagram illustrating the conventional AFEC of FIG. 1 and forward and backward structures are the same.

As shown in FIG. 2, the conventional AFEC 104 includes a first automatic gain control unit 210, a first feedback signal detecting unit 208, a first reverse feedback signal synthesizing unit 206, a first feedback signal removing unit 204, a second automatic gain control unit 222, a second feedback signal detecting unit 220, a second reverse feedback signal synthesizing unit 218, a second feedback signal removing unit 216 and a control unit 214.

The first automatic gain control unit 210 automatically controls an output signal size of the forward relay signal to be relayed. The first feedback signal detecting unit 208 detects a phase and a size of a remaining feedback signal within the forward relay signal from the forward relay signal of the baseband inputted from the first automatic gain control unit 210 and the forward relay signal of the baseband inputted from the first down-converting unit 103, and updates the phase and the size of the feedback signal.

The first reverse feedback signal synthesizing unit 206 generates a reverse feedback signal to be used for removing the feedback signal within the forward relay signal by using the phase and the size of the forward relay signal of the baseband inputted from the first automatic gain control unit 210 and the feedback signal inputted from the first feedback signal detecting unit 208.

The first feedback signal removing unit 204 removes the feedback signal in the forward relay signal down-converted in the first down-converting unit 103 based on the reverse feedback signal from the first reverse feedback signal synthesizing unit 206, and transmits the forward relay signal to the first automatic gain control unit 210.

The second automatic gain control unit 222 automatically controls the output signal size of the backward relay signal to be relayed. The second feedback signal detecting unit 220 detects the phase and the size of the remaining feedback signal within the backward relay signal from the backward relay signal of the baseband inputted from the second automatic gain control unit 222 and the backward relay signal of the baseband inputted from the second down-converting unit 110, and updates the phase and the size of the feedback signal.

The second reverse feedback signal synthesizing unit 218 generates a reverse feedback signal to be used for removing the feedback signal in the backward relay signal based on the phase and the size of the backward relay signal of the baseband inputted from the second automatic gain control unit 222 and the feedback signal inputted from the second feedback signal detecting unit 220.

The second feedback signal removing unit 216 removes the feedback signal in the backward relay signal down-converted in the second down-converting unit 110 based on the reverse feedback signal from the second reverse feedback signal synthesizing unit 218 and transmits the backward relay signal to the second automatic gain control unit 222.

The control unit 214 controls each constituent element to transmit forward/backward relay signals after removing the feedback signal within the forward/backward relay signal to be relayed.

The conventional the AFEC 104 further includes a first automatic delay control unit 212 for preventing interactive interference between a feedback signal and a multipath signal. In the backward structure, a second automatic delay control unit 224 is included to be connected to the second automatic gain control unit 222.

The conventional AFEC operating as described above has the same structures in the forward/backward directions. However, since signal process methods are different in the forward/backward directions, AFEC for the forward direction and AFEC for the backward direction are respectively required for realizing the TDD radio repeater. Accordingly, there are problems that flexibility in arrangement of each constituent element is deteriorated and the size of the TDD radio repeater increases. In addition, consumption power, power loss and production cost increase and the AFECs having the same structure are inefficiently doubly used.

DISCLOSURE

Technical Problem

An embodiment of the present invention is directed to providing a united Adaptive Forward Error Correction (U-AFEC) for improving a service quality by sharing one AFEC in forward/backward directions and completely removing a feedback signal component from a signal to be relayed and improving stability of signal relay through operation adaptive to radio channel environment change, a method thereof, and a computer-readable recording medium for storing a program for realizing the method.

Another embodiment of the present invention is directed to providing a Time Division Duplex (TDD) radio repeater for improving a service quality by sharing one AFEC in forward/backward directions and completely removing a feedback signal component from a signal to be relayed and improving stability of signal relay through operation adaptive to radio channel environment change in the TDD radio repeater.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a united Adaptive Forward Error Correction (U-AFEC), including: an automatic gain control unit for controlling a gain of forward/backward relay signals; a switching unit for switching the forward/backward relay signals from an external down-converting unit; a forward feedback signal detecting unit for detecting and updating a phase and a size of a feedback signal from the forward relay signal of the automatic gain control unit and the feedback detection switching unit; a backward feedback signal detecting unit for detecting and updating the phase and the size of the feedback signal from the backward relay signal of the automatic gain control unit and the feedback detection switching unit; a reverse feedback signal synthesizing unit for generating a reverse feedback signal based on the phase and the size of the feedback signal from the forward/the backward feedback signal detecting unit; a feedback signal removing unit for removing the feedback signal in the forward/backward relay signals from the down-converting unit based on the reverse feedback signal from the reverse feedback signal synthesizing unit and transmitting the forward/backward relay signals to the automatic gain control unit; and a control unit for removing the feedback signal in the forward/backward relay signals and controlling each constituent element based on synchronization information from the synchronization acquiring unit in order to transmit the forward/backward relay signals.

Also, the U-AFEC of the present invention further includes an automatic delay control unit for preventing interactive interference between a feedback signal in the forward/backward relay signals and a multipath signal according to control of the control unit.

In accordance with another aspect of the present invention, there is provided an AFEC method, including: switching a forward relay signal in a forward direction according to control of synchronization information and a backward relay signal in a backward direction; detecting and updating a phase and a size of the forward relay signal switched according to the forward switching and the forward feedback signal from the gain-controlled and fed-back forward relay signal, or detecting and updating a phase and a size of the backward feedback signal from the backward relay signal switched according to the backward switching and the gain-controlled and fed-back backward relay signal; generating a forward reverse feedback signal based on the phase and the size of the gain-controlled and fed-back forward relay signal and the detected forward feedback signal, or generating a backward reverse feedback signal based on the phase and the size of the gain-controlled and fed-back backward relay signal and the detected backward feedback signal; removing the forward feedback signal in the forward relay signal to be relayed based on the generated forward backward feedback signal, or removing the backward feedback signal in the backward relay signal to be relayed based on the generated backward reverse feedback signal; and automatically controlling a gain of the forward relay signal after removing the feedback signal, or automatically controlling a gain of the backward relay signal after removing the feedback signal.

Also, the method of the present invention further includes: preventing interactive interference between the forward feedback signal in the forward relay signal and a multipath signal by controlling a generation timing of the forward feedback signal, or preventing interactive interference between the backward feedback signal in the backward relay signal and the multipath signal by controlling a generation timing of the backward feedback signal.

In accordance with another aspect of the present invention, there is provided a computer-readable recording medium for storing a program for realizing a method in U-AFEC having a processor, the method including: switching a forward relay signal in a forward direction according to control of synchronization information and a backward relay signal in a backward direction; detecting and updating a phase and a size of the forward relay signal switched according to the forward switching and the forward feedback signal from the gain-controlled and fed-back forward relay signal, or detecting and updating a phase and a size of the backward feedback signal from the backward relay signal switched according to the backward switching and the gain-controlled and fed-back backward relay signal; generating a forward reverse feedback signal based on the phase and the size of the gain-controlled and fed-back forward relay signal and the detected forward feedback signal, or generating a backward reverse feedback signal based on the phase and the size of the gain-controlled and fed-back backward relay signal and the detected backward feedback signal; removing the forward feedback signal in the forward relay signal to be relayed based on the generated forward backward feedback signal, or removing the backward feedback signal in the backward relay signal to be relayed based on the generated backward reverse feedback signal; and automatically controlling a gain of the forward relay signal after removing the feedback signal, or automatically controlling a gain of the backward relay signal after removing the feedback signal.

Also, the present invention provides the computer-readable recording medium for storing the program for realizing the method, the method further including: preventing interactive interference between the forward feedback signal in the forward relay signal and a multipath signal by controlling a generation timing of the forward feedback signal, or preventing interactive interference between the backward feedback signal in the backward relay signal and the multipath signal by controlling a generation timing of the backward feedback signal.

In accordance with another aspect of the present invention, there is provided a Time Division Duplex (TDD) radio repeater, including: a transmitting/receiving unit for transmitting/receiving and filtering forward/backward relay signals; a switching unit for switching the forward/backward relay signals according to control of a synchronization acquiring unit; a down-converting unit for down-converting the forward/backward relay signals from the switching unit; a U-AFEC for removing a feedback signal component in the forward/backward relay signals from the down-converting unit and controlling a gain of the forward/backward relay signals; an up-converting unit for up-converting the forward/backward relay signals from the U-AFEC; and the synchronization acquiring unit for acquiring synchronization based on the forward relay signal from the down-converting unit and controlling the U-AFEC and the switching unit.

In accordance with another aspect of the present invention, there is provided another TDD radio repeater, including: a synchronization acquiring unit for acquiring synchronization by using a forward relay signal; and a U-AFEC for removing a feedback component of the forward relay signal and a feedback component of a backward relay signal based on synchronization information from the synchronization acquiring unit.

Advantageous Effects

The present invention described above can improve a service quality by sharing one Adaptive Forward Error Correction (AFEC) in forward/backward directions and completely removing a feedback signal component from a signal to be relayed and improve stability of signal relay through operation adaptive to radio channel environment change in a Time Division Duplex (TDD) radio repeater.

In addition, the present invention has flexibility in arrangement of each constituent element and can reduce a size of the TDD radio repeater in comparison with a conventional method.

The present invention also can realize an efficient TDD radio repeater by reducing consumption power, power loss and production cost.

BEST MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
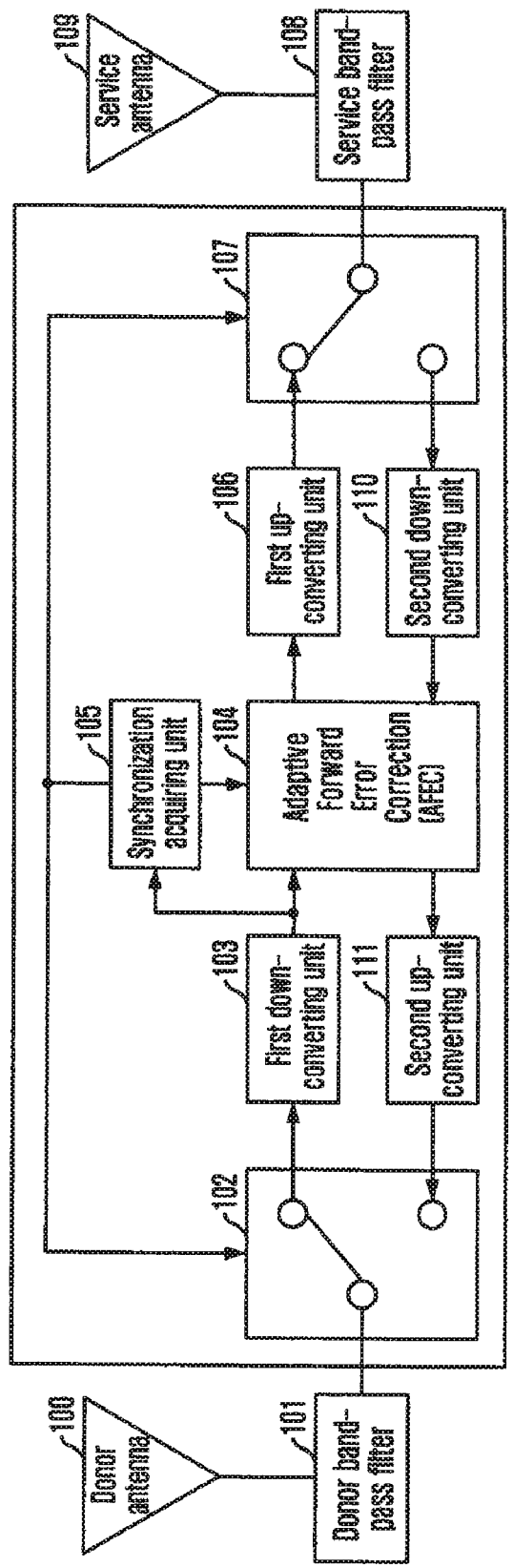
FIG. 1 shows a Time Division Duplex (TDD) radio repeater using conventional Adaptive Forward Error Correction (AFEC).
Figure 2:
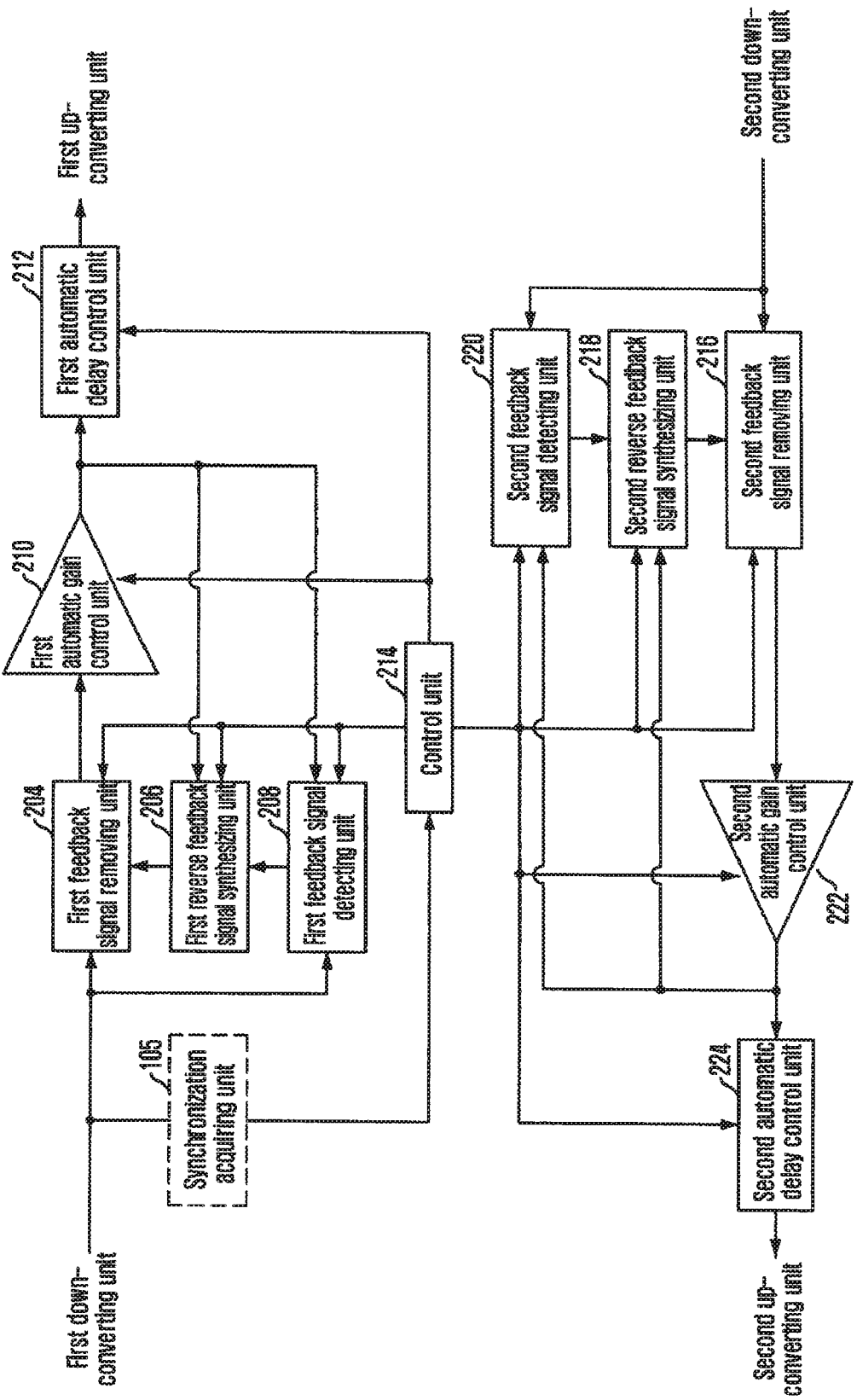
FIG. 2 is a block diagram illustrating the conventional AFEC of FIG. 1.
Figure 3:
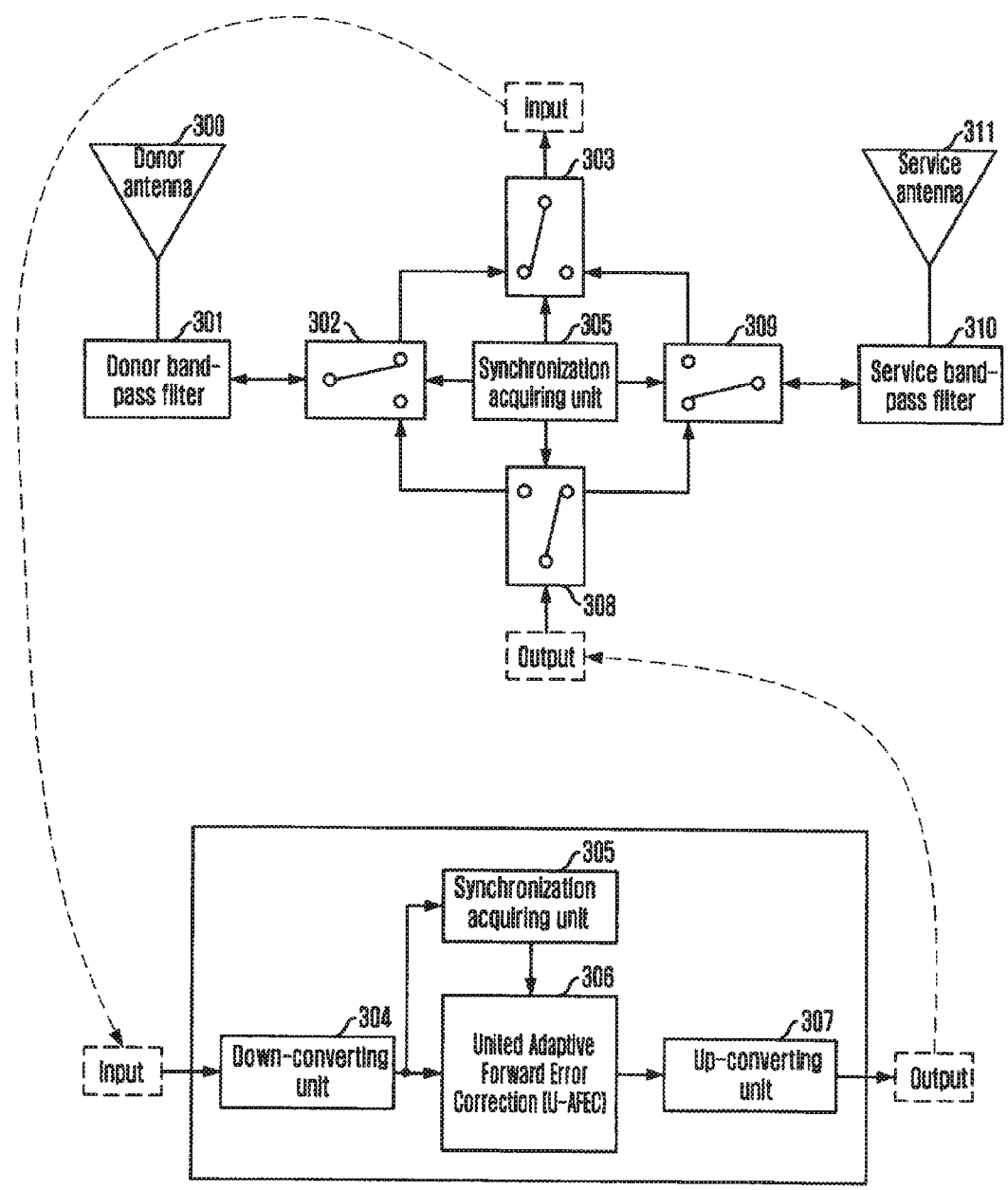
FIG. 3 is a block diagram showing a TDD radio repeater in accordance with an embodiment of the present invention.

FIG. 3 is a block diagram showing a Time Division Duplex (TDD) radio repeater in accordance with an embodiment of the present invention.

As shown in FIG. 3, the TDD radio repeater in accordance with the present invention includes a donor antenna 300, a service antenna 311, a donor band-pass filter 301, a donor switching unit 302, a service band-pass filter 310, a service switching unit 309, an input switching unit 303, a down-converting unit 304, a united Adaptive Forward Error Correction (U-AFEC) 306, an up-converting unit 307, an output switching unit 308 and a synchronization acquiring unit 305.

The donor antenna 300 transmits/receives forward/backward relay signals to be relayed with a base station. The service antenna 311 transmits/receives forward/backward relay signals to be relayed with a terminal of a service region.

The donor band-pass filter 301 performs band filtering on the forward/backward relay signals transmitted/received through the donor antenna 300.

The donor switching unit 302 switches a forward relay signal from the donor band-pass filter 301 to the input switching unit 303 and switches a backward relay signal from the output switching unit 308 to the donor band-pass filter 301.

The service band-pass filter 310 performs band filtering on the forward/backward relay signals transmitted/received through the service antenna 311. The service switching unit 309 switches the backward relay signal from the service band-pass filter 310 to the input switching unit 303 and switches the forward relay signal from the output switching unit 308 to the service band-pass filter 310.

The input switching unit 303 switches the forward relay signal from the donor switching unit 302 and the backward relay signal from the service switching unit 309 to the down-converting unit 304.

The down-converting unit 304 down-converts the forward/backward relay signals from the input switching unit 303. The U-AFEC 306 removes a feedback signal component of the forward and backward relay signals from the down-converting unit 304 and controls a gain of the forward/backward relay signals.

The up-converting unit 307 up-converts the forward/backward relay signals from the U-AFEC 306. The output switching unit 308 switches the forward relay signal from the up-converting unit 307 to the service switching unit 309 and switches the backward relay signal from the up-converting unit 307 to the donor switching unit 302.

The synchronization acquiring unit 305 controls each constituent element such as the U-AFEC 306, the donor switching unit 302, the input switching unit 303, the output switching unit 308, and the service switching unit 309 by acquiring synchronization based on the forward relay signal from the down-converting unit 304.

To have a look at a switching operation in case of a forward relay signal, the synchronization acquiring unit 305 controls the donor switching unit 302 to be an ON state in a direction of the input switching unit 303, and controls the input switching unit 303 to be an ON state in a direction of the donor switching unit 302 in the same manner. Accordingly, the donor switching unit 302 and the input switching unit 303 are connected and the forward relay signal is transmitted to the U-AFEC 306 through the down-converting unit 304. Subsequently, the U-AFEC 306 removes a feedback signal in the forward relay signal according to control of the synchronization acquiring unit 305 and controls a size of an output signal by automatically controlling a gain of the forward relay signal.

The U-AFEC 306 further performs an automatic delay control function for preventing interactive interference between a feedback signal and a multipath signal of the forward relay signals. That is, the U-AFEC 306 controls generation delay of a feedback signal to generate a feedback signal when the multipath signal is not received, thereby allowing the feedback signal to be removed in a state that the multipath signal and the feedback signal are not duplicated.

It will be described in detail hereinafter with reference to FIG. 4. Meanwhile, after removing of the feedback signal, the forward relay signal is transmitted to the output switching unit 308 through the up-converting unit 307. The output switching unit 308 is turned on in the direction of the service switching unit 309 by control of the synchronization acquiring unit 305. In the same manner, the service switching unit 309 is turned on in the direction of the output switching unit 308 by control of the synchronization acquiring unit 305 and is connected to the output switching unit 308. Accordingly, the forward relay signal is transmitted through the service band-pass filter 310 and the service antenna 311.

Since the switching of the backward relay signal is operated in the opposite direction of the switching of the forward backward relay signal, detailed description will not be provided herein.

The U-AFEC 306 estimates a radio channel environment around the feedback signal and the TDD radio repeater based on correlation between the base station identification (ID) acquired in the synchronization acquiring unit 305 and the forward relay signal. It will be described in detail with reference to FIG. 4 hereinafter.

Meanwhile, the synchronization acquiring unit 305 extracts base station information and a synchronization signal based on the forward relay signal from the down-converting unit 304 and controls each constituent element such as the U-AFEC 306, the donor switching unit 302, the input switching unit 303, the output switching unit 308, and the service switching unit 309.

At this time, an initial operation of the synchronization acquiring unit 105 can acquire synchronization when a synchronization signal is stably acquired for a predetermined time, e.g., longer than 3 seconds as a time considered as the same signal strength through a plurality of frames, under a condition that a signal is larger than a predetermined size, e.g., larger than $1/10$ of an average input signal size. Subsequently, the synchronization signal is authorized to the U-AFEC 306. When synchronization is not acquired, the synchronization signal is not authorized to the U-AFEC 306 such that the entire operations of the TDD radio repeater stop until synchronization is acquired.

In addition, the synchronization acquiring unit 305 controls the on/off switching operation of the forward and backward directions in consideration of a signal process time consumed in the U-AFEC 306 of the TDD radio repeater and a time consumed in a filter and other constituent elements to thereby efficiently remove a feedback signal and maintain an output quality at a predetermined level.

Through the operation described above, a service quality is improved by completely removing the feedback signal component from the signal to be relayed by sharing one U-AFEC in the forward/backward directions and stability of signal relay can be improved by adaptively operating to change of the radio channel environment.

Detailed configuration and operation of the U-AFEC 306 will be described with reference to FIG. 4.

Figure 4:
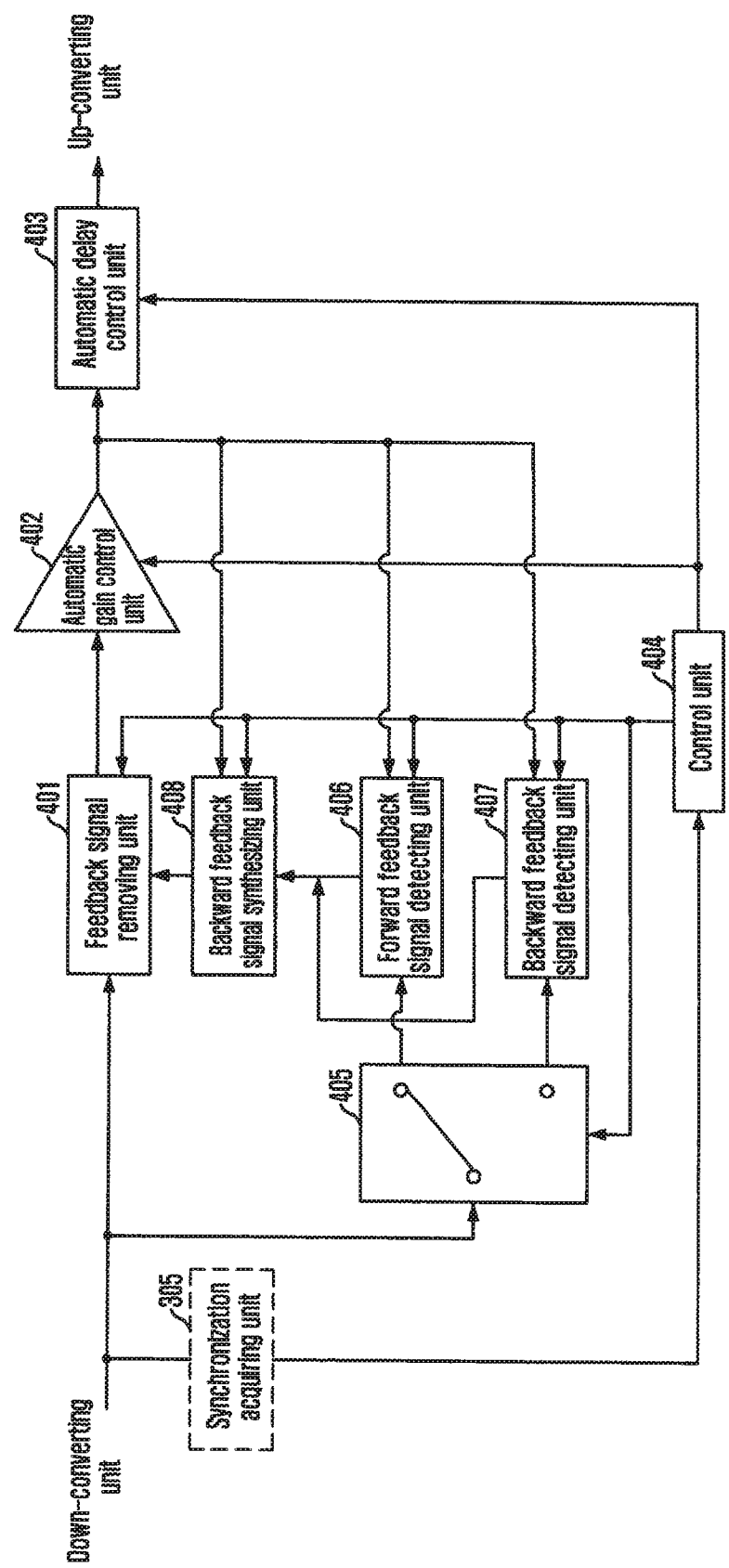
FIG. 4 is a block diagram illustrating a united AFEC of FIG. 3.

FIG. 4 is a block diagram illustrating the U-AFEC of FIG. 3.

As shown in FIG. 4, the U-AFEC 306 in accordance with the present invention includes an automatic gain control unit 402, a feedback detection switching unit 405, a forward feedback signal detecting unit 406, a backward feedback signal detecting unit 407, a reverse feedback signal synthesizing unit 408, a feedback signal removing unit 401 and a control unit 404.

The automatic gain control unit 402 automatically controls a gain of forward/backward relay signals to be relayed, i.e., an output signal size. The feedback detection switching unit 405 switches the forward/backward relay signals from the external down-converting unit 304.

The forward feedback signal detecting unit 406 detects and updates a phase and a size of a feedback signal in the forward relay signal of the automatic gain control unit 402 and the feedback detection switching unit 405.

The backward feedback signal detecting unit 407 detects and updates a phase and a size of a feedback signal in the backward relay signal of the automatic gain control unit 402 and the feedback detection switching unit 405.

The reverse feedback signal synthesizing unit 408 generates a reverse feedback signal based on the phase and the size of the feedback signal from the forward/backward feedback signal detecting units 406 and 407. The feedback signal removing unit 401 removes the feedback signal in the forward/backward relay signals from the external down-converting unit 304 based on the backward feedback signal from the reverse feedback signal synthesizing unit 408 and transmits the forward/backward relay signals to the automatic gain control unit 402.

After removing the feedback signal in the forward/backward relay signals to be relayed, the control unit 400 controls each constituent element based on the synchronization information, e.g., the synchronization signal and the base station information, of the external synchronization acquiring unit 305 to transmit the forward/backward relay signals.

The synchronization acquiring unit 305 is necessary constituent elements required for the radio repeater of the TDD method and extracts a synchronization signal required for exactly controlling a forward signal flow from a base station to a terminal and a backward signal flow from the terminal to the base station.

The synchronization signal extracting procedure is to search a signal, i.e., a preamble, located in the first part in the forward direction from the base station to the terminal.

The preamble is systemized to efficiently extract the synchronization signal according to the TDD method and base station information such as ID on the base station and segment information can be additionally acquired in the synchronization signal extracting procedure. When the synchronization acquiring unit 305 acquires the synchronization signal, searches information on the base station, and transmits the information on the base station to the control unit 404, the control unit 404 controls the operation of the radio repeater according to the TDD method based on the synchronization signal and the base station information transmitted from the synchronization acquiring unit 305.

At this time, the control unit 404 controls the forward/backward operation of the feedback detection switching unit 405 based on the synchronization information, i.e., the synchronization signal and the base station information, from the synchronization acquiring unit 305. The forward relay signal is transmitted to the forward feedback signal detecting unit 406 by the switching operation of the feedback detection switching unit 405 and the backward relay signal is transmitted to the backward feedback signal detecting unit 407.

When it is assumed that a signal to be relayed is a forward signal, the forward feedback signal detecting unit 406 can estimate a feedback signal component based on the base station ID acquired in the synchronization acquiring unit 305. That is, since the base station ID includes a Pseudo Noise (PN) code, a phase and a size of a feedback signal can be estimated by calculating a correlation value between the base station ID and the forward relay signal.

Accordingly, the forward feedback signal detecting unit 406 calculates a correlation value between the base station ID from the control unit 404 and the forward relay signal from the feedback detection switching unit 405 and the automatic gain control unit 402, detects the phase and the size of the remaining feedback signal in the forward relay signal, and updates and transmits the phase and the size of the feedback signal to the reverse feedback signal synthesizing unit 408.

The backward feedback signal detecting unit 407 detects the phase and the size of the remaining feedback signal in the backward relay signal from the automatic gain control unit 402 and the feedback detection switching unit 405, detects and updates the phase and the size of the feedback signal, and transmits the phase and the size of the feedback signal to the reverse feedback signal synthesizing unit 408.

The automatic gain control unit 402 determines a gain value based on the size of the forward/backward relay signal transmitted from the feedback signal removing unit 401, the gain control value according to the current state of the U-AFEC 306, and pre-set target output size value and target gain value transmitted from the control unit 404. Subsequently, the automatic gain control unit 402 automatically controls the gain of the forward/backward relay signal, i.e., the output signal size, based on the determined gain value after removing the feedback signal in the feedback signal removing unit 401.

To have a closer look at the automatic gain control method, when the output value is larger than the pre-set target output size value, the automatic gain control unit 402 limits the output size according to a method for limiting the gain to be lower than a predetermined level. When the output value is smaller than the pre-set target output size value, the automatic gain control unit 402 increases the gain by a predetermined unit time, e.g., 3 dB/1 second, until the size of the signal transmitted from the feedback signal removing unit 401 becomes the target gain value.

The feedback signal removing unit 401 removes a feedback signal from the forward/backward relay signals transmitted from the down-converting unit 304, i.e., the signal including the feedback signal, based on the reverse feedback signal transmitted from the reverse feedback signal synthesizing unit 408, and transmits the forward/backward relay signals to the automatic gain control unit 402.

The reverse feedback signal synthesizing unit 408 generates a reverse feedback signal by controlling the size and the phase of the signal used for removing the feedback signal in the forward/backward relay signals based on the phase and the size of the automatically gain-controlled forward relay signal transmitted from the automatic gain control unit 402 and the feedback signal transmitted from the forward/backward feedback signal detecting units 406 and 407.

The control unit 404 searches forward and backward timings based on the synchronization signal transmitted from the synchronization acquiring unit 305, controls a signal flow from the base station to the terminal, or from the terminal to the base station, and transmits a code required for feedback signal detection, e.g., base station ID, to the forward feedback signal detecting unit 406 based on the base station information transmitted from the synchronization acquiring unit 305.

The synchronization acquiring unit 305 controls the operation of the donor and service switching units 302 and 309, and the input and output switching units 303 and 308 (see FIG. 3). According to the synchronization extracting result in the synchronization acquiring unit 305, the control unit 404 controls the operation of the automatic gain control unit 402, the feedback detection switching unit 405, the forward feedback signal detecting unit 406, the backward feedback signal detecting unit 407, the reverse feedback signal synthesizing unit 408, and the feedback signal removing unit 401.

When a reception signal includes a transmission signal, i.e., when the synchronization acquiring unit 305 acquires a synchronization signal and base station information, the control unit 404 normally operates the automatic gain control unit 402, the feedback detection switching unit 405, the forward feedback signal detecting unit 406, the backward feedback signal detecting unit 407, the reverse feedback signal synthesizing unit 408, and the feedback signal removing unit

401. At this time, the target output size value is pre-set up as a specific value and transmitted to the automatic gain control unit 402.

On the other hand, when the reception signal does not include the transmission signal, i.e., when the synchronization acquiring unit 305 does not acquire the synchronization signal, the control unit 404 stops operating the automatic gain control unit 402, the feedback detection switching unit 405, the forward feedback signal detecting unit 406, the backward feedback signal detecting unit 407, the reverse feedback signal synthesizing unit 408, and the feedback signal removing unit 401.

Meanwhile, the U-AFEC 306 for the radio repeater in accordance with the present invention further includes an automatic delay control unit 403 for preventing interactive interference between the feedback signal and the multipath signal in the forward/backward relay signals. That is, the automatic delay control unit 403 is connected to the automatic gain control unit 402 such that a feedback signal can be generated when the multipath signal is not received, controls a generation delay of the feedback signal such that the feedback signal can be removed in a state that the multipath signal and the feedback signal are not duplicated. Accordingly, it is preferred that the radio repeater pre-checks a timing that the multipath signal is generated, i.e., the location of the multipath component.

Figure 5:
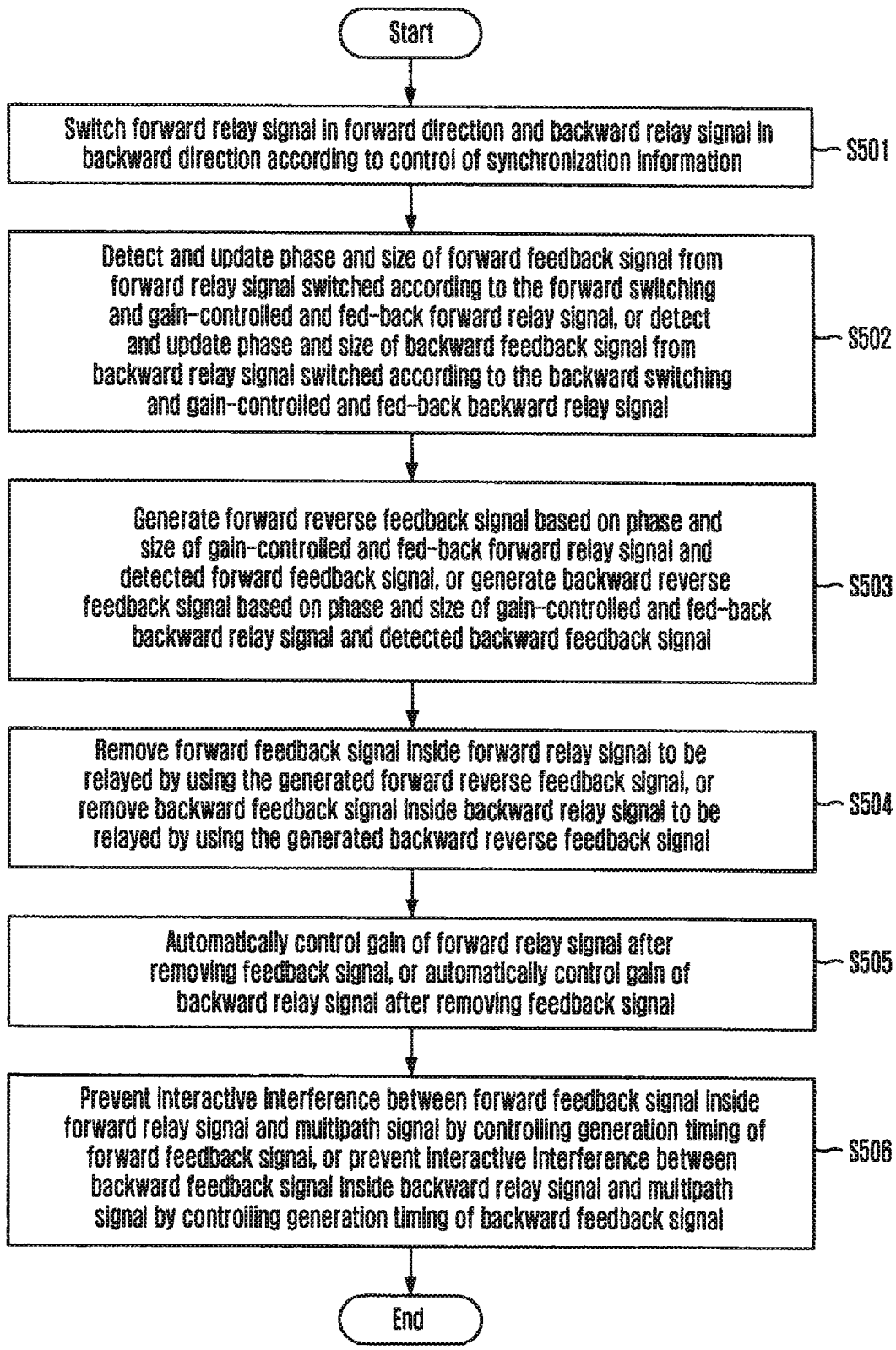
FIG. 5 is a flowchart describing a U-AFEC method in accordance with an embodiment of the present invention.

FIG. 5 is a flowchart describing a U-AFEC method in accordance with an embodiment of the present invention and shows a method for removing a feedback signal remaining on the forward/backward relay signals based on the feedback signal generated after relaying the initial forward/backward signals.

As a reference, in case of downlink in the TDD wireless relay method, a signal received in the U-AFEC 306 through a route from the donor antenna 300 to the down-converting unit 304 may simultaneously include both of a relay signal transmitted to relay an actual service in the base station and a feedback signal of the signal emitted to air through the service antenna 311. Otherwise, only the feedback signal including non-specific noise is included. The base station transmission signal is expressed as a multipath signal by a radio channel environment. A case that there is only the feedback signal in the signal received in the radio repeater is a case that a transmission signal is not transmitted from the base station to the mobile communication terminal. It is the same in the uplink from the terminal to the base station.

Since the detailed embodiment of the present invention is described with reference to FIGS. 3 and 4, a point of the operation will be described in brief with reference to FIG. 5.

At step S501, the feedback detection switching unit 405 switches a forward relay signal to be relayed in a forward direction and a backward relay signal in a backward direction according to control of the control unit 404 based on the synchronization information.

At step S502, the phase and the size of the forward feedback signal are detected and updated from the forward relay signal switched according to the forward switching and the gain-controlled and fed-back forward relay signal. Otherwise, the phase and the size of the backward feedback signal are detected and updated from the backward relay signal switched according to the backward switching and the gain-controlled and fed-back backward relay signal.

At step S503, a forward reverse feedback signal is generated based on the phase and the size of the gain-controlled and fed-back forward relay signal and the detected forward feedback signal, or a backward reverse feedback signal is generated based on the phase and the size of the gain-controlled and fed-back backward relay signal and the detected backward feedback signal.

At step S504, the forward feedback signal in the forward relay signal to be relayed is removed by using the generated forward reverse feedback signal, or the backward feedback signal in the backward relay signal to be relayed is removed by using the generated backward reverse feedback signal.

At step S505, the gain of the forward relay signal is automatically controlled after removing the feedback signal, or the gain of the backward relay signal is automatically controlled after removing the feedback signal.

At step S506, preventing interactive interference between the forward feedback signal in the forward relay signal and the multipath signal by controlling the generation timing of the forward feedback signal, or preventing interactive interference between the backward feedback signal in the backward relay signal and the multipath signal by controlling the generation timing of the backward feedback signal can be additionally performed.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording medium which can be read by the computer.

While the present invention has been described with respect to certain preferred embodiments, it will be apparent to those skilled in the art that various changes and modifications may be made without departing from the scope of the invention as defined in the following claims.

What is claimed is:

1. A Time Division Duplex (TDD) radio repeater, comprising:
   a transmitting/receiving means for transmitting/receiving and filtering forward/backward relay signals;
   a switching means for switching the forward/backward relay signals according to control of a synchronization acquiring means;
   a down-converting means for down-converting the forward/backward relay signals from the switching means;
   a united Adaptive Forward Error Correction (U-AFEC) for removing a feedback signal component in the forward/backward relay signals from the down-converting means and controlling a gain of the forward/backward relay signals;
   an up-converting means for up-converting the forward/backward relay signals from the U-AFEC; and
   the synchronization acquiring means for acquiring synchronization based on the forward relay signal from the down-converting means and controlling the U-AFEC and the switching means
   wherein the U-AFEC includes:
   an automatic gain control unit for controlling the gain of the forward/backward relay signals;
   a feedback detection switching unit for switching the forward/backward relay signals from the down-converting means;
   a forward feedback signal detecting unit for detecting and updating a phase and a size of a feedback signal from the forward relay signal of the automatic gain control unit and the feedback detection switching unit;
   a backward feedback signal detecting unit for detecting and updating the phase and the size of the feedback signal from the backward relay signal of the automatic gain control unit and the feedback detection switching unit;

a reverse feedback signal synthesizing unit for generating a reverse feedback signal based on the phase and the size of the feedback signal from the forward or backward feedback signal detecting unit;

a feedback signal removing unit for removing the feedback signal in the forward/backward relay signals from the down-converting means based on the reverse feedback signal from the reverse feedback signal synthesizing unit and transmitting the forward/backward relay signals to the automatic gain control unit; and a control unit for removing the feedback signal in the forward/backward relay signals and controlling each constituent element based on synchronization information from the synchronization acquiring means in order to transmit the forward/backward relay signals.

2. The TDD radio repeater of claim 1, wherein the switching means includes:

a donor switching unit for switching a forward reception relay signal from the transmitting/receiving means according to control of the synchronization acquiring means and switching a backward transmission relay signal to the transmitting/receiving means;

a service switching unit for switching the backward reception relay signal from the transmitting/receiving means according to control of the synchronization acquiring means and switching a forward transmission relay signal to the transmitting/receiving means;

an input switching unit for switching the forward reception relay signal from the donor switching unit and the backward reception relay signal from the service switching unit to the down-converting means according to control of the synchronization acquiring means; and an output switching unit for switching the forward transmission relay signal from the up-converting means to the service switching unit according to control of the synchronization acquiring means and switching the backward transmission relay signal from the up-converting means to the donor switching unit.

3. The TDD radio repeater of claim 2, wherein the synchronization acquiring means controls the U-AFEC, the donor switching unit, the input switching unit, the output switching unit, and the service switching unit by acquiring base station information and a synchronization signal based on the forward relay signal from the down-converting means.

4. The TDD radio repeater of claim 3, wherein the synchronization acquiring means controls an on/off switching operation of the forward and backward directions in consideration of a signal process time consumed in the U-AFEC and a time consumed in each of other constituent elements.

5. The TDD radio repeater of claim 1, wherein the U-AFEC further performs an automatic delay control function for preventing interactive interference between the feedback signal in the forward/backward relay signals and a multipath signal.

6. The TDD radio repeater of claim 5, wherein the U-AFEC detects a phase and a size of a feedback signal remaining in the forward relay signal based on correlation between base station identification (ID) acquired in the synchronization acquiring means and a forward relay signal.

7. A Time Division Duplex (TDD) radio repeater, comprising:

a synchronization acquiring means for acquiring synchronization by using forward relay signal; and a united Adaptive Forward Error Correction (U-AFEC) for removing a feedback component of the forward relay signal and a feedback component of a backward relay signal based on synchronization information from the synchronization acquiring means wherein the U-AFEC includes:

an automatic gain control unit for controlling the gain of the forward/backward relay signals;

a switching unit for switching the forward/backward relay signals from a down-converting means;

a forward feedback signal detecting unit for detecting and updating a phase and a size of a feedback signal from the forward relay signal of the automatic gain control unit and the switching unit;

a backward feedback signal detecting unit for detecting and updating the phase and the size of the feedback signal from the backward relay signal of the automatic gain control unit and the switching unit;

a reverse feedback signal synthesizing unit for generating a reverse feedback signal based on the phase and the size of the feedback signal from the forward or backward feedback signal detecting unit;

a feedback signal removing unit for removing the feedback signal in the forward/backward relay signals from the down-converting means based on the reverse feedback signal from the reverse feedback signal synthesizing unit and transmitting the forward/backward relay signals to the automatic gain control unit; and a control unit for removing the feedback signal in the forward/backward relay signals and controlling each constituent element based on synchronization information from the synchronization acquiring means in order to transmit the forward/backward relay signals.

8. A united Adaptive Forward Error Correction (U-AFEC), comprising:

an automatic gain control means for controlling a gain of forward/backward relay signals;

a switching means for switching the forward/backward relay signals from an external down-converting means;

a forward feedback signal detecting means for detecting and updating a phase and a size of a feedback signal from the forward relay signal of the automatic gain control means and the switching means;

a backward feedback signal detecting means for detecting and updating the phase and the size of the feedback signal from the backward relay signal of the automatic gain control means and the feedback detection switching means;

a reverse feedback signal synthesizing means for generating a reverse feedback signal based on the phase and the size of the feedback signal from the forward or backward feedback signal detecting means;

a feedback signal removing means for removing the feedback signal in the forward/backward relay signals from the external down-converting means based on the reverse feedback signal from the reverse feedback signal synthesizing means and transmitting the forward/backward relay signals to the automatic gain control means; and a control means for removing the feedback signal in the forward/backward relay signals and controlling each constituent element based on synchronization information from a synchronization acquiring means in order to transmit the forward/backward relay signals.

9. The U-AFEC of claim 8, further comprising:

an automatic delay control means for preventing interactive interference between a feedback signal in the forward/backward relay signals and a multipath signal according to control of the control means.

10. The U-AFEC of claim 9, wherein the automatic delay control means is connected to the automatic gain control means such that a feedback signal can be generated when the multipath signal is not received, and controls a generation delay of the feedback signal according to control of the control means such that the feedback signal can be removed in a state that the multipath signal and the feedback signal are not duplicated.

11. The U-AFEC of claim 8, wherein the forward feedback signal detecting unit calculates a correlation value between base station identification (ID) from the control means and the forward relay signal from the feedback detection switching means and the automatic gain control means, detects and updates a phase and a size of a feedback signal remaining in the forward relay signal.

12. The U-AFEC of claim 8, wherein the automatic gain control unit determines a gain value based on a size of the forward/backward relay signals from the feedback signal removing unit, a gain control value according to a current state of the U-AFEC, and a pre-set target output size value and a target gain value from the control means, and automatically controls a gain of the forward/backward relay signals after removing the feedback signal in the feedback signal removing means.

13. The U-AFEC of claim 8, wherein the control means searches forward and backward timings based on a synchronization signal transmitted from the synchronization acquiring means, controls a flow of the forward/backward relay signals, transmits the base station ID required for feedback signal detection to the forward feedback signal detecting unit based on base station information from the synchronization acquiring means, and controls an operation of the automatic gain control means, the switching means, the forward feedback signal detecting means, the backward feedback signal detecting means, the reverse feedback signal synthesizing means, and the feedback signal removing means according to a synchronization acquisition result of the synchronization acquiring means.

14. An Adaptive Forward Error Correction (AFEC) method, comprising:
  switching a forward relay signal in a forward direction according to control of synchronization information and a backward relay signal in a backward direction;
  detecting and updating a phase and a size of the forward feedback signal from the forward relay signal switched according to the forward switching and the controlled and fed-back forward relay signal, or detecting and updating a phase and a size of the backward feedback signal from the backward relay signal switched according to the backward switching and the gain-controlled and fed-back backward relay signal;
  generating a forward reverse feedback signal based on the phase and the size of the gain-controlled and fed-back forward relay signal and the detected forward feedback signal, or generating a backward reverse feedback signal based on the phase and the size of the gain-controlled and fed-back backward relay signal and the detected backward feedback signal;
  removing the forward feedback signal in the forward relay signal to be relayed based on the generated forward reverse feedback signal, or removing the backward feedback signal in the backward relay signal to be relayed based on the generated backward reverse feedback signal; and
  automatically controlling a gain of the forward relay signal after removing the feedback signal, or automatically controlling a gain of the backward relay signal after removing the feedback signal.

15. The AFEC method of claim 14, further comprising:
  preventing interactive interference between the forward feedback signal in the forward relay signal and a multipath signal by controlling a generation timing of the forward feedback signal, or preventing interactive interference between the backward feedback signal in the backward relay signal and the multipath signal by controlling a generation timing of the backward feedback signal.

16. A non-transitory computer-readable recording medium comprising executable program instructions to cause a processor to perform a method in united Adaptive Forward Error Correction (U-AFEC), the method comprising:
  switching a forward relay signal in a forward direction according to control of synchronization information and a backward relay signal in a backward direction;
  detecting and updating a phase and a size of the forward feedback signal from the forward relay signal switched according to the forward switching and the gain-controlled and fed-back forward relay signal, or detecting and updating a phase and a size of the backward feedback signal from the backward relay signal switched according to the backward switching and the gain-controlled and fed-back backward relay signal;
  generating a forward reverse feedback signal based on the phase and the size of the gain-controlled and fed-back forward relay signal and the detected forward feedback signal, or generating a backward reverse feedback signal based on the phase and the size of the gain-controlled and fed-back backward relay signal and the detected backward feedback signal;
  removing the forward feedback signal in the forward relay signal to be relayed based on the generated forward reverse feedback signal, or removing the backward feedback signal in the backward relay signal to be relayed based on the generated backward reverse feedback signal; and
  automatically controlling a gain of the forward relay signal after removing the feedback signal, or automatically controlling a gain of the backward relay signal after removing the feedback signal.

17. The non-transitory computer-readable recording medium of claim 16, the method further comprising:
  preventing interactive interference between the forward feedback signal in the forward relay signal and a multipath signal by controlling a generation timing of the forward feedback signal, or preventing interactive interference between the backward feedback signal in the backward relay signal and the multipath signal by controlling a generation timing of the backward feedback signal.

* * * * *